United States Patent
Kim et al.

(10) Patent No.: US 11,157,810 B2
(45) Date of Patent: Oct. 26, 2021

(54) RESISTIVE PROCESSING UNIT ARCHITECTURE WITH SEPARATE WEIGHT UPDATE AND INFERENCE CIRCUITRY

(71) Applicant: International Business Machines Corporation, Armonk, NY (US)

(72) Inventors: Seyoung Kim, White Plains, NY (US); Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 15/954,170

(22) Filed: Apr. 16, 2018

(65) Prior Publication Data
US 2019/0318239 A1    Oct. 17, 2019

(51) Int. Cl.
  *G06N 3/08*    (2006.01)
  *G06N 3/04*    (2006.01)
  *G06N 3/063*   (2006.01)
(52) U.S. Cl.
  CPC ............. *G06N 3/08* (2013.01); *G06N 3/04* (2013.01); *G06N 3/0635* (2013.01)
(58) Field of Classification Search
  CPC ........... G06N 3/08; G06N 3/04; G06N 3/0635
  See application file for complete search history.

(56) References Cited

U.S. PATENT DOCUMENTS 7,286,429 B1   10/2007   Liaw et al.
9,070,424 B2    6/2015   Youn et al.
(Continued)

FOREIGN PATENT DOCUMENTS

CN      102033146 A      4/2011
KR   10-2017-0108627 A   9/2017
(Continued)

OTHER PUBLICATIONS

Hasan et al., "Enabling Back Propagation Training of Memristor Crossbar Neuromorphic Processors", 2014, 2014 International Joint Conference on Neural Networks (IJCNN), pp. 21-28. (Year: 2014).*

(Continued)

*Primary Examiner* — Kamran Afshar
*Assistant Examiner* — Ying Yu Chen
(74) *Attorney, Agent, or Firm* — L. Jeffrey Kelly; Ryan, Mason & Lewis, LLP (57) ABSTRACT

Systems and methods are provided to perform weight update operations in a resistive processing unit (RPU) system to update weight values of RPU devices comprising tunable resistive device. A weight update operation for a given RPU device includes maintaining a weight update accumulation value for the RPU device, adjusting the weight update accumulation value by one unit update value in response to a detected coincidence of stochastic bits streams of input vectors applied on an update row and update column control lines connected to the RPU device, generating a weight update control signal in response to the accumulated weight value reaching a predefined threshold value, and adjusting a conductance level of the tunable resistive device by one unit conductance value in response to the weight update control signal, wherein the one unit conductance value corresponds to one unit weight value of the RPU device.

20 Claims, 6 Drawing Sheets

(56) References Cited

U.S. PATENT DOCUMENTS

| | | | |
|---|---|---|---|
| 9,087,578 | B2 | 7/2015 | Vimercati et al. |
| 9,224,464 | B2 | 12/2015 | Chou et al. |
| 9,256,823 | B2* | 2/2016 | Sinyavskiy ............ G06N 3/049 |
| 9,472,245 | B2 | 10/2016 | Lee et al. |
| 9,508,233 | B2 | 11/2016 | Kelly et al. |
| 9,530,114 | B2 | 12/2016 | King et al. |
| 9,617,011 | B2 | 4/2017 | Derenick et al. |
| 9,852,790 | B1 | 12/2017 | Gokmen et al. |
| 2015/0170025 | A1 | 6/2015 | Wu et al. |
| 2015/0278682 | A1* | 10/2015 | Saxena .................. G11C 11/54 706/23 |
| 2017/0011290 | A1* | 1/2017 | Taha .................... G06N 3/0635 |
| 2017/0109628 | A1 | 4/2017 | Gokmen et al. |

FOREIGN PATENT DOCUMENTS

| | | |
|---|---|---|
| TW | 200611492 A | 4/2006 |
| TW | 201727656 A | 8/2017 |

OTHER PUBLICATIONS

English translation for Korean Application No. KR1020170108627A.
English translation for Taiwan Application No. TW201727656A.
English translation for Taiwan Application No. TW200611492A.
O. Krestinskaya et al., "Memristor Load Current Mirror Circuit," International Conference on Advances in Computing, Communications and Informatics (ICACCI), Aug. 10-13, 2015, pp. 538-542.
S. Kim et al., "Analog CMOS-Based Resistive Processing Unit for Deep Neural Network Training," IEEE 60th International Midwest Symposium on Circuits and Systems (MWSCAS), Aug. 6-9, 2017, 4 pages.
S.M.A. Mokhtar et al., "Write and Read Circuit for Memristor Analog Resistance Switching," IEEE 8th Control and System Graduate Research Colloquium (ICSGRC), Aug. 4-5, 2017, pp. 13-16.
C.G. Looney, "Advances in Feedforward Neural Networks: Demystifying Knowledge Acquiring Black Boxes," IEEE Transactions on Knowledge and Data Engineering, pp. 211-226, Apr. 1996, vol. 8, No. 2.
T. Gokmen et al., "Acceleration of Deep Neural Network Training with Resistive Cross-Point Devices: Design Considerations," Frontiers in Neuroscience, Jul. 2016, pp. 1-13, vol. 10, No. 333.
P.T. Elliott et al., "Training Reformulated Product Units in Hybrid Neural Networks," International Joint Conference on Neural Networks (IJCNN), Jul. 16-21, 2006, pp. 5051-5058.
H. Kim et al., "Neural Synaptic Weighting with a Pulse-Based Memristor Circuit," IEEE Transactions on Circuits and Systems 1: Regular Papers, Jan. 2012, pp. 148-158, vol. 59, No. 1.
K.J. Miller et al., "Habits without Values," bioRxiv 067603, Aug. 3, 2016, 24 pages.
The International Search Report and Written Opinion for PCT/IB2019/052663 dated Jun. 19, 2019.

* cited by examiner

FIG. 1

FIG. 2A  $y = W \times x$  FORWARD PASS

FIG. 2B  $z = W^T \times \delta$  BACKWARD PASS

FIG. 2C  $w_{ij} \leftarrow w_{ij} + \eta\, x_i \times \delta_j$  WEIGHT UPDATE

RESISTIVE PROCESSING UNIT ARCHITECTURE WITH SEPARATE WEIGHT UPDATE AND INFERENCE CIRCUITRY

TECHNICAL FIELD

This disclosure generally relates to resistive processing unit (RPU) frameworks and, in particular, to techniques for updating and reading weight values stored in RPU storage cells.

BACKGROUND

In recent years, deep neural network (DNN) based models have made significant progress due to the availability of large labeled datasets and continuous improvements in computation resources. DNNs are utilized in various applications including, for example, object/speech recognition, language translation, pattern extraction, and image processing. The quality of the DNN models depends on the processing of a large amount of training data and an increased complexity of the neural network. In this regard, training a complex DNN model is a time consuming and computationally intensive task which can require many days or weeks to perform using parallel and distributed computing frameworks with many computing nodes (e.g., datacenter-scale computational resources) to complete the training of the DNN model.

To reduce training time, hardware acceleration techniques for processing DNN workloads have been pursued either in conventional CMOS technologies or by using emerging non-volatile memory (NVM) technologies. However, it has been found that RPU accelerator devices have the potential to accelerate DNN training by orders of magnitude, while using less power, as compared to conventional hardware acceleration techniques. DNN training generally relies on a backpropagation algorithm which includes three repeating cycles: forward, backward and weight update. It has been determined that RPU accelerator devices which are based on a two-dimensional (2D) crossbar array of RPU storage cells, can be configured to perform all three cycles of the backpropagation algorithm in parallel, thus potentially providing significant acceleration in DNN training with lower power and reduced computation resources as compared to state-of-the-art implementations using central processing units (CPUs) and graphics processing units (GPUs). An RPU accelerator can store and update weight values locally, thereby minimizing data movement during the training process and fully exploiting the locality and the parallelism of the DNN training process.

A stochastically trained DNN comprising arrays of RPU cells can have synaptic weights implemented using various types of tunable resistive devices including, for example, memristive devices, capacitors/read transistors, etc. To properly train a DNN and achieve high-accuracy, the operating characteristics of the tunable resistive devices should meet a stringent set of specifications of acceptable RPU device parameters that a given DNN algorithm can tolerate without significant error penalty. These specifications include, for example, variations in RPU device switching characteristics, such as, minimum incremental conductance change ($\pm \Delta g_{min}$) due to a single coincidence event, asymmetry in up and down conductance changes, tunable range of the conductance values, etc.

In particular, one important specification for DNN training is that the RPU cells should have a tunable conductance with a resolution (or dynamic range) of at least 1000 conductance levels (or steps), wherein the conductance levels can be switched (via 1-ns pulses) from a lowest conductance state to a highest conductance state in an analog and symmetrically incremental manner (with at least one order of magnitude of conductance difference between the maximum and minimum conductance state (on/off ratio)). To achieve symmetry of up/down changes of a minimum unit weight value ($\pm \Delta w_{min}$) in an RPU cell, each incremental increase (step up, $\Delta g_{min}^{+}$) and incremental decrease (step down, $\Delta g_{min}^{-}$) in the associated conductance level of the RPU cell should be the same amount or a similar amount within no more than 5% mismatch error. In other words, tunable resistive RPU devices, which are analog in nature, should respond symmetrically in up and down conductance changes when provided the same but opposite pulse stimulus. Despite these requirements, however, tunable resistive device can exhibit limited dynamic range, resolution, and variability in tuning/programming characteristics, making hardware implementation of the RPU architecture non-trivial.

SUMMARY

Embodiments of the invention include RPU cell architectures and methods for performing weight update and read operations in RPU cells in which separate matrices are utilized to independently perform separate weight update accumulation and inference (weight read) operations within a crossbar array of RPU cells comprising tunable resistive devices.

One embodiment includes an RPU device, which comprises: weight update accumulation circuitry having a first input connected to an update row control line, and a second input connected to an update column control line; weight update control circuitry connected to an output of the weight update accumulation circuitry; and a tunable resistive device coupled to the weight update control circuitry, and connected to a read row control line and a read column control line. The weight update accumulation circuitry is configured to (i) maintain a weight update accumulation value $h_{ij}$ and adjust the weight update accumulation value $h_{ij}$ by one unit update value $\Delta h$ in response to each detected coincidence of stochastic bits streams of input vectors applied on the update row and update column control lines, and (ii) output a weight update control signal to the weight update control circuitry in response to the accumulated weight value $h_{ij}$ reaching a predefined threshold value. The weight update control circuitry is configured to adjust a conductance level of the tunable resistive device by one unit conductance value $\Delta g$ in response to the weight update control signal output from the weight update accumulation circuitry, wherein the one unit conductance value $\Delta g$ corresponds to one unit weight value $\Delta w$ of the RPU device. Another embodiment comprises a method for performing a weight update operation to update a weight value of an RPU device comprising a tunable resistive device. The weight update operation comprises: maintaining a weight update accumulation value $h_{ij}$ for the RPU device; adjusting the weight update accumulation value $h_{ij}$ by one unit update value $\Delta h$ in response to a detected coincidence of stochastic bits streams of input vectors applied on an update row and update column control lines connected to the RPU device; generating a weight update control signal in response to the accumulated weight value $h_{ij}$ reaching a predefined threshold value; and adjusting a conductance level of the tunable resistive device by one unit conductance value $\Delta g$ in response to the weight update control signal, wherein the one unit conductance value Δg corresponds to one unit weight value Δw of the RPU device.

Other embodiments will be described in the following detailed description of embodiments, which is to be read in conjunction with the accompanying figures.

DETAILED DESCRIPTION OF EMBODIMENTS

Embodiments of the invention will now be discussed in further detail with regard RPU cell architectures and methods in which separate matrices are utilized to independently perform separate weight update accumulation and inference (weight read) operations within a crossbar array of RPU cells comprising tunable resistive devices. It is to be noted that the same or similar reference numbers are used throughout the drawings to denote the same or similar features, elements, or structures, and thus, a detailed explanation of the same or similar features, elements, or structures will not be repeated for each of the drawings.

Figure 1:
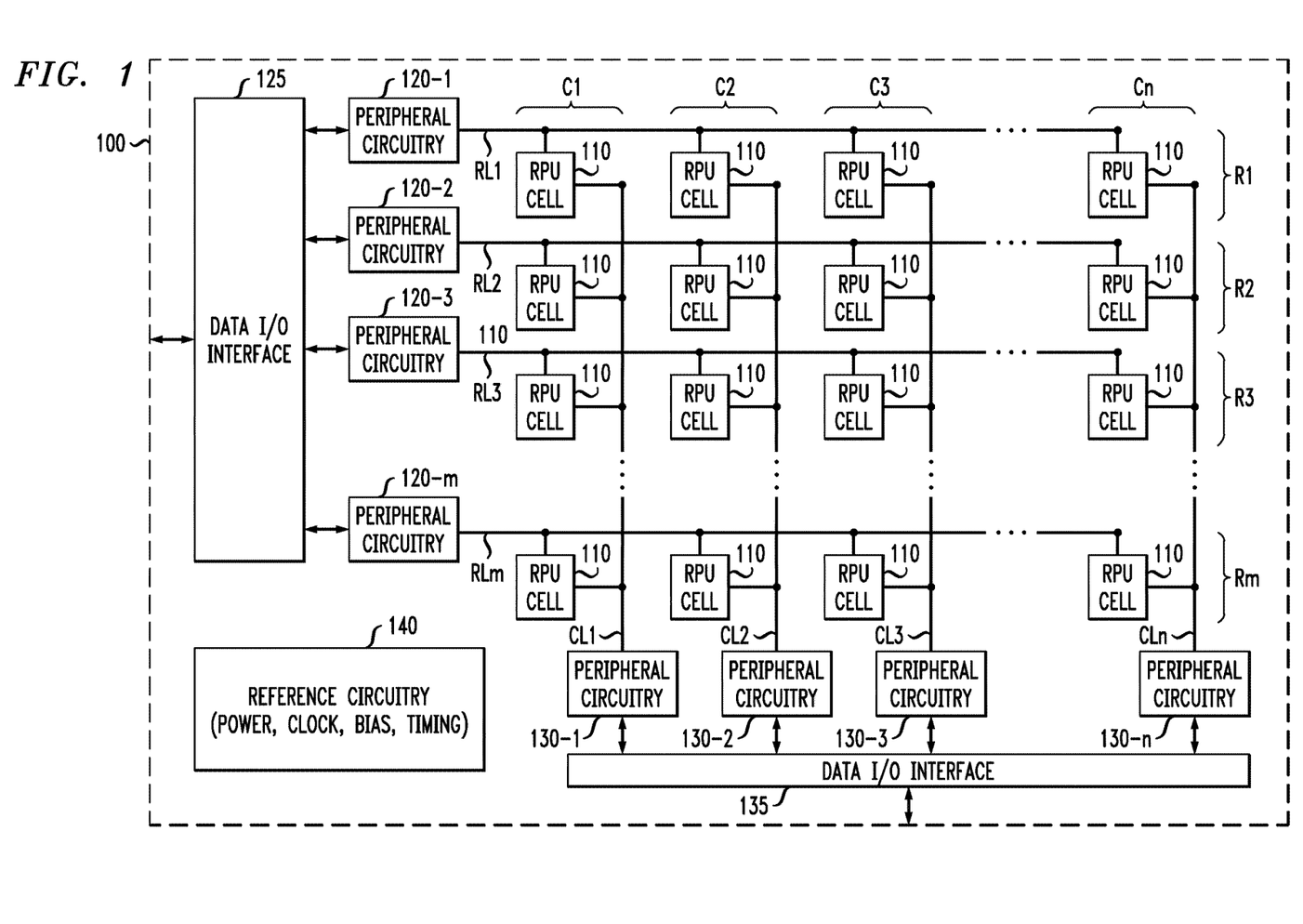
FIG. 1 schematically illustrates an RPU system which can be implemented using RPU cell architectures according to embodiments of the invention.

FIG. 1 schematically illustrates an RPU system 100 which can be implemented using RPU cell architectures according to embodiments of the invention. The RPU system 100 comprises a two-dimensional (2D) crossbar array of RPU cells 110 arranged in a plurality of rows R1, R2, R3, ..., Rm, and a plurality of columns C1, C2, C3, ..., Cn. The RPU cells 110 in each row R1, R2, R3, ..., Rm are commonly connected to respective row control lines RL1, RL2, RL3, ..., RLm (collectively, row control lines RL). The RPU cells 110 in each column C1, C2, C3, ..., Cn are commonly connected to respective column control lines CL1, CL2, CL3, ..., CLn (collectively, column control lines CL). Each RPU cell 110 is connected at (and between) a cross-point (or intersection) of a respective one of the row and column control lines. In one example embodiment, the RPU system 100 comprises a 4,096×4,096 array of RPU cells 110.

The RPU system 100 further comprises separate blocks of peripheral circuitry 120-1, 120-2, 120-3, ..., 120-m (collectively, peripheral circuitry 120) connected to respective row control lines RL1, RL2, RL3, ..., RLm, as well as separate blocks of peripheral circuitry 130-1, 130-2, 130-3, ..., 130-n (collectively, peripheral circuitry 130) connected to respective column control lines CL1, CL2, CL3, ..., CLn. Further, each block of peripheral circuitry 120-1, 120-2, 120-3, ..., 120-m (for the rows) is connected to a data input/output (I/O) interface block 125. Similarly, each block of peripheral circuitry 130-1, 130-2, 130-3, ..., 130-n (for the columns) is connected to a data I/O interface block 135. The RPU system 100 further comprises reference circuitry 140 which comprises various types of circuit blocks such as power, clock, bias and timing circuitry to provide power distribution and control signals and clocking signals for operation of the RPU system 100.

In some embodiments, the RPU system 100 is configured to perform DNN computations wherein a conductance of each RPU cell 100 represents a matrix element or weight $w_{ij}$, which can be updated or accessed through operations of the peripheral circuitry 120 and 130 (wherein $w_{ij}$ denotes a weight value for the $i^{th}$ row and the $j^{th}$ column in the array of RPU cells 110). As noted above, DNN training generally relies on a backpropagation process which comprises three repeating cycles: a forward cycle, a backward cycle, and a weight update cycle. The RPU system 100 can be configured to perform all three cycles of the backpropagation process in parallel, thus potentially providing significant acceleration in DNN training with lower power and reduced computation resources. The RPU system 100 can be configured to perform vector-matrix multiplication operations in the analog domain in a parallel manner, which leads to a significant enhancement in performance (e.g., 10K× or more) as compared to a counterpart CPU/GPU implementation.

While the row control lines RL and column control lines CL are each shown in FIG. 1 as a single line for ease of illustration, it is to be understood that each row and column control line can include two or more control lines connected to the RPU cells 110 in the respective rows and columns, depending on the implementation. For example, in one embodiment, each row control line RL and each column control line CL comprises a pair of control lines, including an "Update" control line, and a "Read" control line, wherein the cell conductance (e.g., weight value) of a given RPU cell 100 can be adjusted and sensed through the Update and Read control lines, respectively, for a given row and column connected to the given RPU cell 110.

In some embodiments, each block of peripheral circuitry 120 and 130 comprises essentially the same set of circuit blocks connected to the respective rows and columns in the 2D array of RPU cells 110 to perform forward, backward and update operations for a backpropagation process. For example, in one embodiment, to support an RPU cell update operation (e.g., update a weight value of given RPU cell 110), each block of peripheral circuitry 120 and 130 comprises a stochastic pulse generator block and an update pulse driver block, which are responsive to update vectors that are received during a weight update cycle, to generate and apply a series of stochastically populated pulses to coincidence detection circuitry (within a given RPU cell 110) and perform operations to update the weight value of the given RPU cell 110. In particular, as discussed in further detail below, the stochastic pules are transmitted on the Update row and Update column control lines connected to the given RPU cell 110 and processed using coincidence detection circuitry to perform various operations (e.g., multiplication) for updating a stored weight value within the RPU cell 110.

In addition, in one embodiment, to support RPU cell read/sensing operations (e.g., read a weight value of given RPU cell 110), each block of peripheral circuitry 120 and 130 comprises (i) a pulse-width modulation (PWM) circuit and read pulse driver circuit to generate and apply PWM read pulses to the RPU cells 110, in response to input vector values (read input values) received during forward/backward cycles, and (ii) a current integrator circuit and analog-to-digital (ADC) circuit to integrate read currents ($I_{READ}$) which are output and accumulated from the connected RPU cells 110 and convert the integrated currents into digital values (read output values) for subsequent computation.

The data I/O interface 125 provides an interface that is configured to (i) receive external control signals and apply update and read input values to the blocks of peripheral circuitry 120, and (ii) receive digital read output values from the blocks of peripheral circuitry 120, and send the digital read output signals to a remote element for processing. Similarly, the data I/O interface 135 provides an interface that is configured to (i) receive external control signals and apply update and read input values to the blocks of peripheral circuitry 130, and (ii) receive digital read output values from the blocks of peripheral circuitry 130, and send the digital read output signals to a remote element for processing.

Each RPU cell 110 in the RPU system 100 comprises a resistor-like circuit component with a tunable conductance, wherein the conductance value of each RPU cell 110 represents a matrix element or weight. For example, in some embodiments, the RPU cells 110 can be implemented using a variable resistance device such as a resistive memory element used in resistive random-access memory (RRAM) systems. In particular, as is known in the art, a resistive memory cell comprises a metal-insulator-metal (MIM) structure in which the insulator layer (e.g., metal-oxide) exhibits a variable resistance through a resistive switching behavior.

In other embodiments, the RPU cells 110 can be implemented using an analog CMOS framework comprising a capacitor and one or more read transistors, wherein the capacitor serves as a memory element in the RPU cell which stores a weight value in the form of capacitor voltage. As explained in further detail below, the capacitor voltage, or weight voltage Vw, is directly applied to the gate terminal(s) of the read transistor(s) to modulate the channel resistance of the read transistor(s). The charge state stored in the capacitor can be accessed by applying small bias across the read transistor(s) to generate drain currents, which generate a read current, $I_{READ}$, which flows out of the RPU cell and is processed in the respective blocks of peripheral circuitry 120 and 130.

As is known in the art, fully connected DNNs comprise stacks of fully connected layers such that a signal propagates from an input layer to an output layer by going through series of linear and non-linear transformations. The entire DNN expresses a single differentiable error function that maps the input data to class scores at the output layer. Typically, a DNN is trained using a simple stochastic gradient decent (SGD) scheme, in which an error gradient with respect to each parameter is calculated using the backpropagation algorithm. The backpropagation algorithm is composed of three cycles, forward, backward and weight update that are repeated many times until a convergence criterion is met. The forward and backward cycles mainly involve computing vector-matrix multiplication operations in forward and backward directions using the 2D crossbar array of RPU device cells 110 of the RPU system shown in FIG. 1.

Figure 2A:
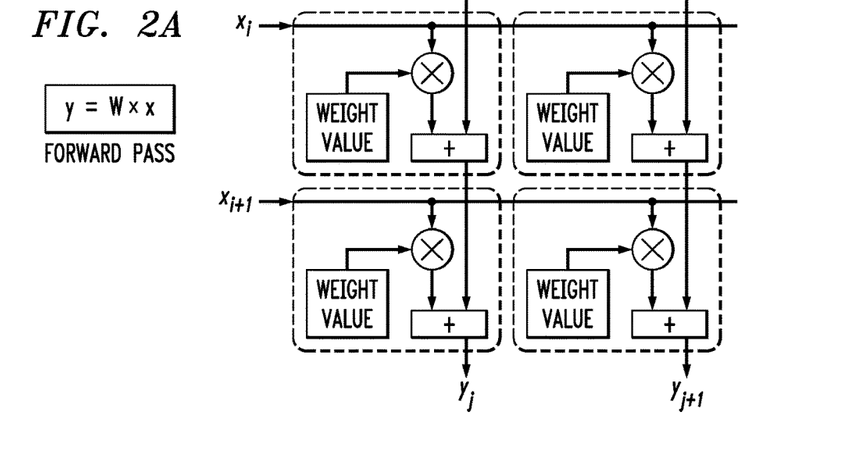
FIG. 2A schematically illustrates a forward pass operation of a backpropagation process, which can be performed using the RPU system of FIG. 1.
Figure 2B:
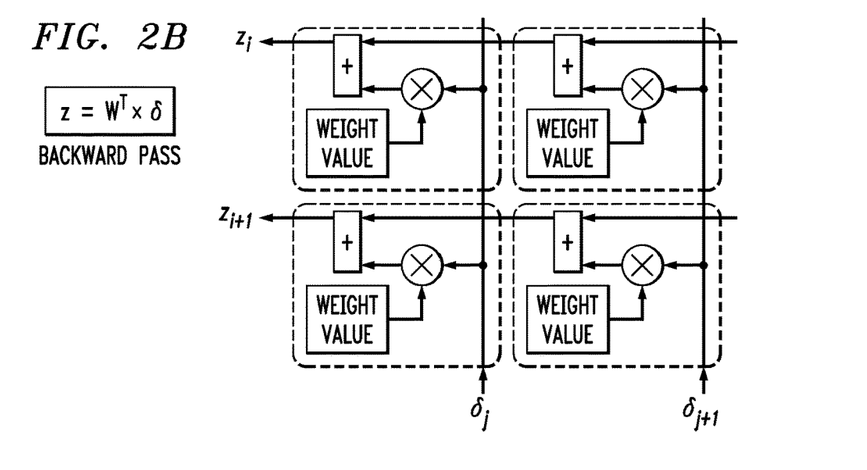
FIG. 2B schematically illustrates a backward pass operation of a backpropagation process, which can be performed using the RPU system of FIG. 1.
Figure 2C:
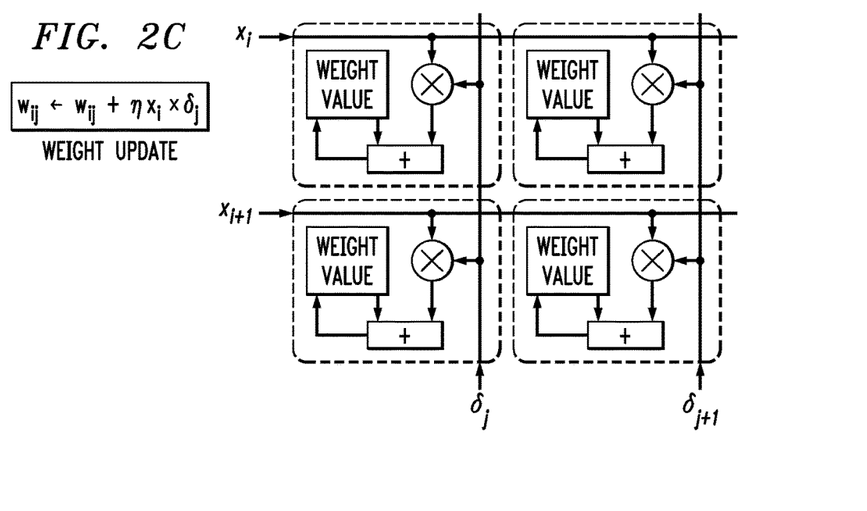
FIG. 2C schematically illustrates a weight update operation of a backpropagation process, which can be performed using the RPU system of FIG. 1.

In the RPU system 100 of FIG. 1, the conductance values $g_{ij}$ in the 2-D crossbar array of RPU cells form a matrix W of weight values $w_{ij}$. In a forward cycle (FIG. 2A), an input vector (in the form of voltage pulses) is transmitted through each of the input rows in the 2-D crossbar array to perform a vector-matrix multiplication in the RPU cells 110. In a backward cycle FIG. 2B), voltage pulses supplied from the columns are input to the RPU cells 110, and a vector-matrix product is computed on the transpose of the weight matrix W values. In contrast to forward and backward cycles, implementing the weight update on a 2D crossbar array of resistive devices requires calculating a vector-vector outer product which consists of a multiplication operation and an incremental weight update to be performed locally at each cross-point RPU device in the array. FIGS. 2A, 2B, and 2C schematically illustrate respective forward pass, backward pass, and weight update operations of a backpropagation algorithm which can be performed using the RPU system 100 of FIG. 1.

For a single fully connected layer where N input neurons are connected to M output (or hidden) neurons, the forward pass (FIG. 2A) involves computing a vector-matrix multiplication y=Wx, where the vector x of length N represents the activities of the input neurons and the matrix W of size M×N stores the weight values between each pair of input and output neurons. The resulting vector y of length M is further processed by performing a non-linear activation on each of the elements and then passed to the next layer. Once the information reaches the final output layer, an error signal is calculated and back propagated through the network. In the forward cycle, the stored conductance values in the crossbar array of RPU cells 110 form a matrix, whereas the input vector is transmitted as voltage pulses through each of the input rows R1, R2, R3, . . . , Rm.

The backward cycle (FIG. 2B) on a single layer also involves a vector-matrix multiplication on the transpose of a weight matrix, $z=W^T\delta$, where W denotes the weight matrix, where the vector $\delta$ of length M represents the error calculated by the output neurons, and where the vector z of length N is further processed using the derivative of neuron non-linearity and then passed down to the previous layers. In a backward cycle, voltage pulses are supplied to the RPU cells 110 from columns CL1, CL2, CL3, . . . , CLn as an input, and the vector-matrix product is computed on the transpose of the weight matrix W.

Finally, in an update cycle (FIG. 2C), the weight matrix W is updated by performing an outer product of the two vectors that are used in the forward and the backward cycles. In particular, implementing the weight update on a 2D crossbar array of resistive devices locally and all in parallel, independent of the array size, requires calculating a vector-vector outer product which consists of a multiplication operation and an incremental weight update to be performed locally at each cross-point (RPU cell 110) in the RPU system of FIG. 1. As schematically illustrated in FIG. 2C, the weight update process is computed as: $w_{ij} \leftarrow w_{ij} + \eta x_i \times \delta_j$, where $w_{ij}$ represents the weight value for the $i^{th}$ row and the $j^{th}$ column (for simplicity layer index is omitted), where $x_i$ is the activity at the input neuron, $\delta_j$ is the error computed by the output neuron, and where it denotes a global learning rate.

In summary, all operations on the weight matrix W can be implemented with using the 2D crossbar array of two-terminal RPU device with M rows and N columns where the stored conductance values in the crossbar array form the matrix W. In the forward cycle, input vector x is transmitted as voltage pulses through each of the rows and the resulting vector y can be read as current signals from the columns. Similarly, when voltage pulses are supplied from the columns as an input in the backward cycle, then a vector-matrix product is computed on the transpose of the weight matrix $W^T$. Finally, in the update cycle, voltage pulses representing vectors x and $\delta$ are simultaneously supplied from the rows and the columns. In the update cycle, each RPU cell 110 performs a local multiplication and summation operation by processing the voltage pulses coming from the column and the row and hence achieving an incremental weight update.

To determine the product of the xi and $\delta$j vectors for the weight update cycle, stochastic translator circuitry in the peripheral circuit blocks 120 and 130 is utilized to generate stochastic bit streams that represent the input vectors xi and $\delta$j. The stochastic bits streams for the vectors xi and $\delta$j are fed through rows and columns in the 2-D crossbar array of RPU cells, wherein the conductance of a given RPU cell will change depending on the coincidence of the xi and $\delta$j stochastic pulse streams input to the given RPU cell. The vector cross product operations for the weight update operation are implemented based on the known concept that that coincidence detection (using an AND logic gate operation) of stochastic streams representing real numbers is equivalent to a multiplication operation.

All three operating modes described above allow the RPU cells forming the neural network to be active in all three cycles and, thus, enable a very efficient implementation of the backpropagation algorithm to compute updated weight values of the RPU cells during a DNN training process. As noted above, a stochastically trained DNN comprising arrays of RPU cells can have synaptic weights implemented using various types of tunable resistive devices including, for example, memristive devices, capacitors/read transistors, etc. To properly train a DNN and achieve high-accuracy, the operating characteristics of the tunable resistive devices should meet a stringent set of specifications including, but not limited to, the ability to achieve a symmetric incremental (increase/decrease) weight value update $\pm\Delta w_{min}$ in the RPU cells. To achieve such symmetry, the RPU system should be configured to switch the conductance levels of a given RPU cell from a lowest conductance state to a highest conductance state in an analog and symmetrically incremental manner, wherein each incremental increase (step up, $\Delta g_{min}^+$) and incremental decrease (step down, $\Delta g_{min}^-$) in the conductance level should be the same or similar amount within no more than 5% mismatch error. In particular, the Up/Down symmetry, $$\frac{\Delta g_{min}^+}{\Delta g_{min}^-},$$

should be equal to 1.0±0.05. It is to be noted that the parameter $\Delta g_{min}^\pm$ is proportional to the parameter $\Delta w_{min}^\pm$ through an amplification factor defined by the peripheral circuitry. However, tunable resistive device such as memristive devices (or memristors) typically exhibit variability in tuning/programming characteristics, making it difficult to achieve symmetric weight updates over the range (min-max) of conductance levels.

To address the variability in tuning/programming characteristics of tunable resistive devices and to implement RPU systems using tunable resistive devices with relaxed specifications, embodiments of the invention provide RPU cell architectures in which separate matrices are utilized to perform weight update accumulation operations and inference (weight read) operations. In particular, as shown in FIG. 2C, a conventional RPU system utilizes a single weight matrix W to perform a weight update process: $w_{ij} \leftarrow w_{ij} + \eta x_i \times \delta_j$, where $w_{ij}$ represents the weight value for the $i^{th}$ row and the $j^{th}$ column. RPU systems according to embodiments of the invention are implemented using a weight matrix W, as well as a separate "hidden weight update accumulation" matrix, denoted as H. The H matrix is utilized to perform a weight update accumulation process: $h_{ij} \leftarrow h_{ij} + \eta x_i \times \delta_j$, where $h_{ij}$ represents a weight update accumulation value for the $i^{th}$ row and the $j^{th}$ column. With this scheme, when the weight update accumulation value $h_{ij}$ meets a prespecified threshold value $H_{Threshold}$, the corresponding weight value $w_{ij}$ is incremented or decremented by one unit, $\Delta W_{min}$. The accumulated weight update operations are performed using the H matrix in an update path, which is hidden from the inference path. The W matrix for the inference path is not updated every iteration of the accumulated weight update, but rather the W matrix value $w_{ij}$ for the given RPU cell 300 is updated when the H matrix value $h_{ij}$ of the RPU cell meets the prespecified threshold value $H_{Threshold}$.

Figure 3:
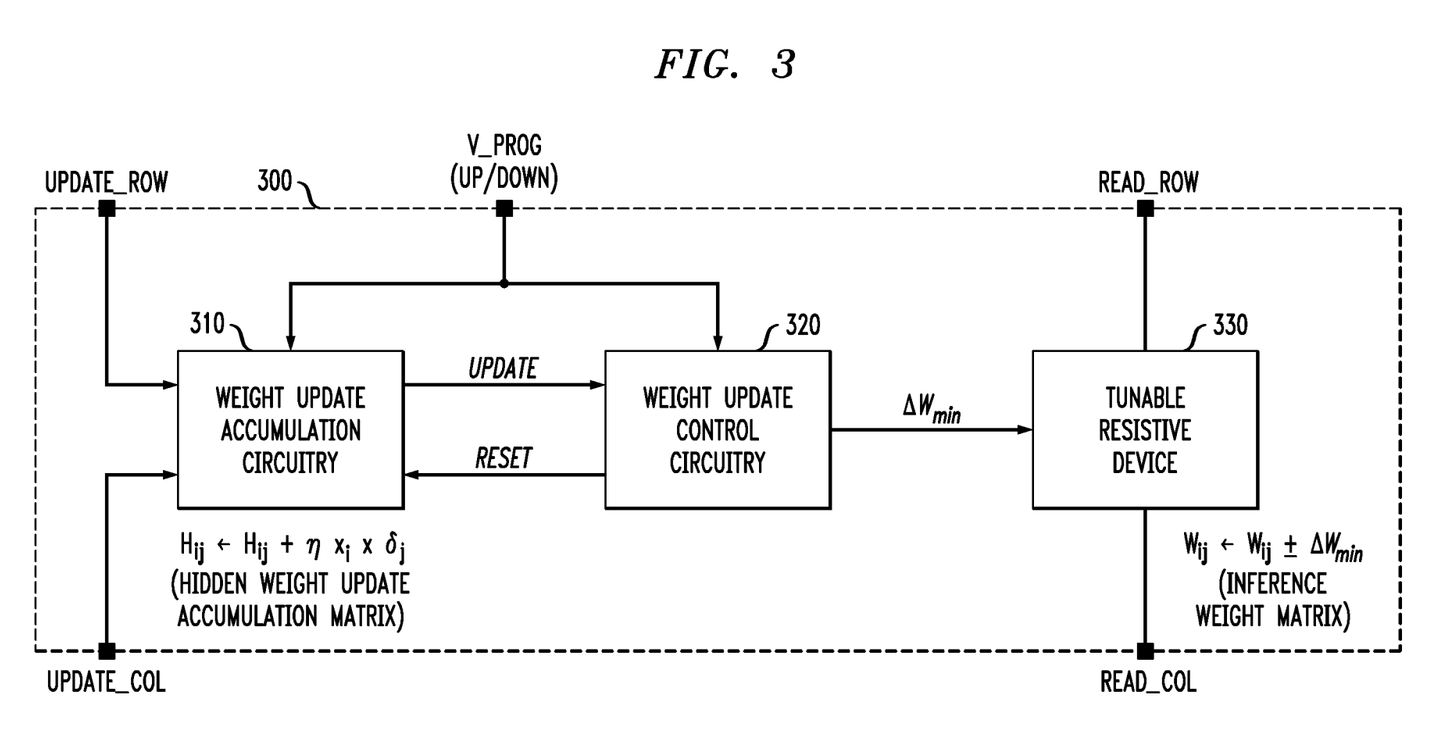
FIG. 3 is a high-level schematic illustration of an RPU cell architecture in which separate weight matrices are implemented to independently perform separate weight update accumulation and inference (weight read) operations, according to an embodiment of the invention.

For example, FIG. 3 is a high-level schematic illustration of an RPU cell architecture in which separate weight matrices are implemented to independently perform separate weight update accumulation and inference (weight read) operations, according to an embodiment of the invention. In particular, FIG. 3 illustrates an RPU cell 300 which comprise weight update accumulation circuitry 310, weight update control circuitry 320, and a tunable resistive device 330. The weight update accumulation circuitry 310 has inputs connected to Update_Row and Update_Col control lines, and the tunable resistive device 330 is connected to Read_Row and Read_Col control lines. The weight update accumulation circuitry 310 and the weight update control circuitry 320 receive as input a programming polarity control signal (V_Prog) which controls a direction (increment or decrement) of the incremental weight value updates. In some embodiments, the tunable resistive device 330 is implemented using a memristor device, or other types of variable-resistance devices that are suitable for the given application such as resistive memory cells that are utilized in resistive random-access memory (RRAM). In particular, as is known in the art, a resistive memory cell comprises a metal-insulator-metal (MIM) structure in which the insulator layer (e.g., metal-oxide) exhibits a variable resistance through a resistive switching behavior.

In the RPU cell 300, the weight update accumulation circuitry 310 is configured to perform local multiplication operations (vector cross product operations) using a coincidence detection method to perform a weight update accumulation process: $h_{ij} \leftarrow h_{ij} + \eta x_i \times \delta_j$. As noted above, a weight update operation is implemented based on the concept that performing coincidence detection (e.g., AND operation) of stochastic bit streams representing real numbers is equivalent to a multiplication operation. In this regard, the product of $x_i$ and $\delta_j$ (in $h_{ij} \leftarrow h_{ij} + \eta x_i \times \delta_j$) is computed by inputting stochastic bit streams representing vectors $x_i$ and $\delta_j$ to the weight update accumulation circuitry 310 on the Update_Row and Update_Col control lines, respectively, wherein the weight update accumulation circuitry 310 updates the accumulated weight value $h_{ij}$ depending on the coincidence of the two input stochastic bit streams $x_i$ and $\delta_j$.

When the weight update accumulation value $h_{ij}$ meets the prespecified threshold value $H_{Threshold}$, the weight update accumulation circuitry 310 will generate and send an update control signal (Update) to the weight update control circuitry 320. In response to the update control signal, the weight update control circuitry 320 will adjust a conductance level of the tunable resistive device 330 by one step (i.e., increment or decrement conductive level by one step $\Delta g_{min}^{\pm}$). In other words, the weight update control circuitry 320 will adjust the corresponding weight value $w_{ij}$ of the RPU cell 300 by one unit, $\Delta W_{min}$, wherein a new weight value $w_{ij}$ will be computed by adding or subtracting $\Delta W_{min}$ from the currently stored weight value $w_{ij}$ (i.e., $w_{ij} \leftarrow w_{ij} \pm \Delta W_{min}$). The incremental changes to the accumulated weight update values $h_{ij}$ and the inference weight values $w_{ij}$ will be increasing (Up) or decreasing (Down), depending on the polarity of the programming polarity control signal (V_Prog) input to the circuit blocks 310 and 320.

When the inference weight value $w_{ij}$ of the tunable restive device 330 is updated in the given RPU cell 300, the weight update control circuitry 320 will generate and send a reset control signal (Reset) to the weight update accumulation circuitry 310. In response to the reset control signal, the weight update accumulation circuitry 310 will reset the value of $h_{ij}$ to a predefined, initialized value, and begin a new weight update accumulation cycle for the given RPU cell. In the exemplary framework of the RPU cell 300, the inference operations (e.g., forward/backward pass operations shown in FIGS. 2A and 2B) are performed on the W matrix independent from the weight update accumulation operations that are performed on the H matrix across the RPU cell array. The W matrix value $w_{ij}$ of a given RPU cell is not updated on each update iteration on the H matrix value $h_{ij}$ of the given RPU cell, but rather the W matrix value $w_{ij}$ is updated when the H matrix value $h_{ij}$ meets a predefined threshold value. With this framework, the number of states for the W matrix values $w_{ij}$ can be reduced from, e.g., 1200 states to 40 states, wherein a number of states for the H matrix values $h_{ij}$ can be, e.g., 30. In this regard, the W matrix value of a given RPU cell can be updated by one unit value $\pm \Delta W_{min}$ each time the H matrix values for the given RPU cell cycle through the 30 states. This effectively emulates an RPU cell with 1200 conductance levels (states), e.g., 30 H matrix values for each of the 40 W matrix values (30×40=1200).

With this framework, the incremental updates on the W matrix values are performed less frequently than the incremental updates on the H matrix values, thereby allowing the W matrix to be implemented using tunable resistive devices with relaxed specifications and constraints. For example, rather than having to implement RPU cells with memristive devices having 1000 or more conductance states, the memristive devices can be implemented with a conductance resolution of 40 levels or less, providing relaxed device constraints. For example, the tunable resistive device 330 in FIG. 3 can be implemented using a hafnium oxide (HfOx)-based RRAM device. In addition, with this RPU cell framework, the incremental updates on the W matrix values are not required to be symmetric. In addition, the exemplary RPU cell framework allows forward and update operations to be performed concurrently, and provides increased performance speed by eliminating the need to perform a global update cycle on the W matrix.

In some embodiments, the number of states for the H matrix values can be 30 or more, depending on the application. With the exemplary framework of the RPU cell 300 of FIG. 3, the incremental updates of the H matrix values should be symmetric. In this regard, the weight update accumulation circuitry 310 can be readily implemented using various circuit topologies and configurations to enable symmetric incremental/decremental updates of the H matrix values $h_{ij}$ of the RPU cells. Alternate embodiments for implementing the weight update accumulation circuitry 310 and associated RPU cell architecture will now be discussed in further detail with reference to the example embodiments shown in FIGS. 4, 5, 6, and 7.

Figure 4:
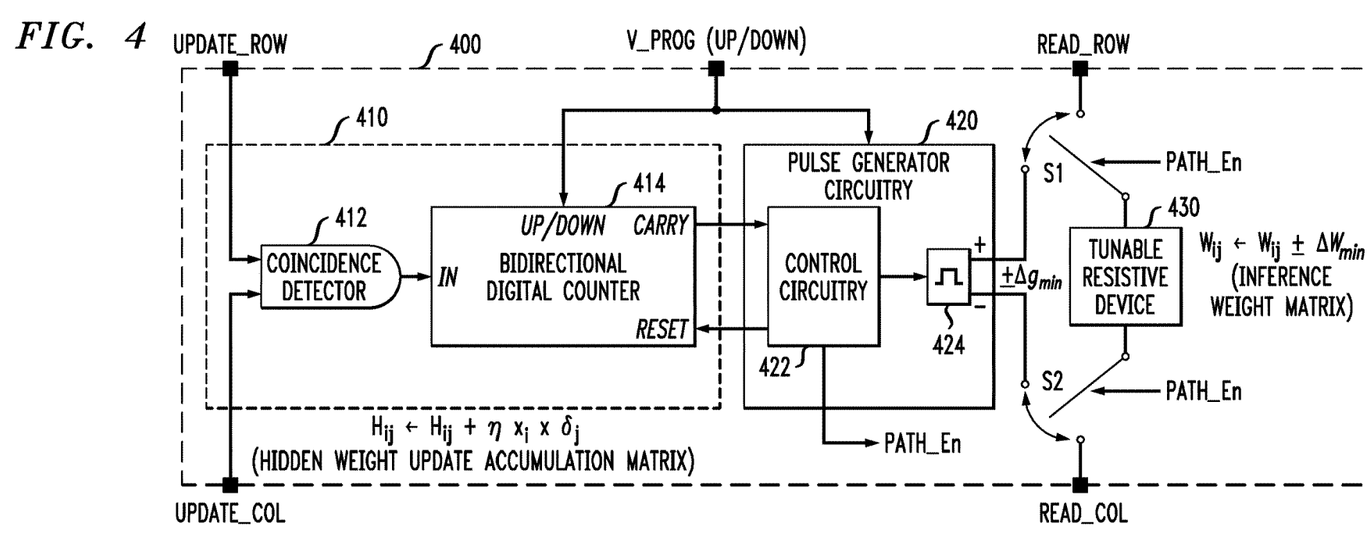
FIG. 4 schematically illustrates an RPU cell architecture in which separate weight matrices are implemented to independently perform separate weight update accumulation and inference operations, according to another embodiment of the invention.

For example, FIG. 4 schematically illustrates an RPU cell 400 which implements separate weight matrices to independently perform separate inference (weight read) and weight update accumulation operations, according to another embodiment of the invention. The RPU cell 400 comprises weight update accumulation circuitry 410, pulse generator circuitry 420, a tunable resistive device 430, and first and second switches S1 and S2. The weight update accumulation circuitry 410 comprises a coincidence detector 412 and a bidirectional digital counter 414 (or Up/Down counter). The pulse generator circuitry 420 comprises control circuitry 422 and a pulse generator 424. The weight update accumulation circuitry 410 shown in FIG. 4 is an example embodiment of the weight update accumulation circuitry 310 of FIG. 3 as discussed above. In addition, the pulse generator circuitry 420 and the first and second switches S1 and S2 shown in FIG. 4 collectively provide an example embodiment of the weight update control circuitry 320 of FIG. 3 as discussed above.

In one embodiment, the coincidence detector 412 comprises an AND logic gate having inputs connected to the Update_Row and Update_Col control lines and an output connected to a data input (IN) of the bidirectional digital counter 414. For a weight update process using a stochastic computing scheme, the AND logic gate enables a local multiplication operation wherein an incremental update of the H matrix value $h_{ij}$ of the RPU cell 400 is performed each time stochastic pulses on the Update_Row and Update_Col control lines are coinciding (e.g., when the AND gate inputs have coinciding logic "1" pulses). When pulse coincidence is detected on the Update_Row and Update_Col control lines, the coincidence detector 412 will output a logic level "1", for example, to the data input IN of the bidirectional digital counter 414.

The bidirectional digital counter 414 can be implemented using any suitable digital counter circuit configuration which is configured to count in both directions, either Up or Down, depending on the logic level of the programming polarity control signal V_Prog applied to the Up/Down control input of the bidirectional digital counter 414. In particular, the bidirectional digital counter 414 is configured to count in any direction (up or down) through any given count sequence, wherein the count direction can be reversed at any point within a count sequence based on the logic level of V_Prog applied to the Up/Down control input of the bidirectional digital counter 414.

When the count value of the bidirectional digital counter 414 reaches a prespecified count value, the bidirectional digital counter 414 outputs a control signal Carry to an input of the pulse generator circuitry 420. In response to the Carry control signal, the pulse generator circuitry 420 will generate a voltage pulse (of a prespecified duration) on the positive (+) and negative (−) output terminals of the pulse generator circuitry 420, which is applied to the tunable resistive device 430 to either increment or decrement the conductance level of the tunable resistive device 420 by one unit $\pm\Delta g_{min}$. The unit change $\pm\Delta g_{min}$ of the conductance level corresponds to a unit change $\pm\Delta W_{min}$ of the weight value $w_{ij}$ of the RPU cell 400 (wherein the new weight value is computed by adding or subtracting $\Delta W_{min}$ from the currently stored weight value $w_{ij}$ (i.e., $w_{ij} \leftarrow w_{ij} + +\Delta W_{min}$)). The pulse generator circuitry 420 will generate and output a reset control signal which is applied to a Reset input of the bidirectional digital counter 414 to reset the bidirectional digital counter 414 to a prespecified initialization count value.

More specifically, as shown in FIG. 4, the control circuitry 422 of the pulse generator circuitry 420 is configured to perform various functions including (i) receiving and processing a Carry signal output from the bidirectional digital counter 414, (ii) generating and outputting a Reset control signal to reset the bidirectional digital counter 414, (iii) generating and outputting a path enable control signal (Path_En) which controls the first and second switches S1 and S2, and (iv) generating an activation signal to the pulse generator 424 which causes the pulse generator 424 to generate and output a weight update pulse on the output terminals (+) and (−) of the pulse generator circuitry 420.

As shown in FIG. 4, the first and second switches S1 and S2 are controlled by the Path_En control signal output from the control circuitry 422. Depending on the polarity of the Path_En control signal, the RPU cell 400 will be configured in either an "update path" or "inference path" configuration. In the update path configuration, the first and second switches S1 and S2 are activated to connect the tunable resistive device 430 to and between the positive (+) and negative (−) output terminals of the pulse generator circuitry 420. In this configuration, the pulse generator circuitry 420 applies a weight update voltage pulse to the tunable resistive device 430 to either increment or decrement the conductance value of the tunable resistive device 430 by one unit $\pm\Delta g_{min}$. The polarity of the weight update voltage pulse with either be positive (+) or negative (−) depending on the logic level of the V_Prog control signal. For example, a positive pulse (with a predetermined pulse width) is applied at the output of the pulse generator circuitry 420 to increase the conductance level of the tunable resistive device 430 by one unit and a negative pulse (with a predetermined pulse width) is applied at the output of the pulse generator circuitry 420 to decrease the conductance level of the tunable restive device 430 by one unit $-\Delta g_{min}$.

On the other hand, in the inference path configuration, the first and second switches S1 and S2 are activated to connect the tunable resistive device 430 to and between the Read_Row and Read_Col control lines to read the weight value $w_{ij}$ of the RPU cell 400. For example, in the inference path configuration, the weight value $w_{ij}$ of the RPU cell 400 can be read in a forward and/or backward (read) operation by applying voltage pulses with predefined amplitudes on the Read_Row and Read_Col control lines, and then measuring a read current, bead, which is generated by the tunable resistive device 430 and output on either the Read_Row control line (backward operation) or the Read_Col control line (forward operation). The read current, bead, is integrated and digitized in the peripheral circuitry (see FIG. 1), and processed to perform vector-matrix multiplication operations.

While the first and second switches S1 and S2 are generically depicted in FIG. 4, it is to be understood that each switch S1 and S2 can be implemented using one or more MOSFET transistors to provide switching circuitry within the RPU cell 400 which is response to the logic level of the Path_En control signal to configure either the weight update path or the weight read (inference) path. In the example embodiment shown in FIG. 4, the inference operations to read the weight value of the RPU cell 400 (for forward and backward pass operations) can be performed concurrently with the accumulated weight update operations performed by the weight update accumulation circuitry 410. Further when a Carry signal is generated and output from the bidirectional digital counter 414, the pulse generator circuitry 420 can proceed to perform a weight update operation for the given RPU cell 400 in an asynchronous manner, such that the weight update operation of the given RPU cell 400 can be locally performed to adjust the conductance level of the tunable resistive device 430 without synchronizing with weight update operations in other RPU cells, and even when weight reading (inference) operations are being performed in the RPU array. In another embodiment, a synchronous weight update framework can be implemented using a suitable control/timing protocol so that a plurality of RPU cells with pending Carry signals asserted, are configured to concurrently perform their local weight update operations by, e.g., delaying the output of programming pulses from the pulse generator circuitry until a global update signal/cycle is generated/initiated.

In one example embodiment, a local weight update operation of the RPU cell can be performed as follows. During forward and backward operating modes of the RPU system, the control circuitry 422 will set the Path_En control signal to a first logic level (e.g., Path_En=logic "1"), which activates the first and second switches S1 and S2 to connect the tunable resistive device 430 to and between the Read_Row and Read_Col control lines. In this state, inference operations can be performed by the RPU system to read/sense the current weight value of the RPU cell 400. When a Carry control signal is output from the bidirectional digital counter 414, the control circuitry 422 will set the Path_En control signal to a second logic level (e.g., Path_En=logic "0"), which activates the first and second switches S1 and S2 to connect the tunable resistive device 430 to and between the positive (+) and negative (−) output terminals of the pulse generator circuitry 420. In this state, the control circuitry 422 generates an activation signal to the pulse generator block 424, which causes the pulse generator block 424 to generate and apply a weight update programming pulse (with a predefined pulse width) to the tunable resistive device 430 and adjust the conductance level of the tunable resistive device 430 by one unit conductance level. Once the programming pulse is applied to the tunable resistive device 430, the control circuitry 422 will generate and output a reset control signal to the Reset input port of the bidirectional digital counter 414. In response to the reset control signal, the bidirectional digital counter 414 will be reset to the initialization count value, and the Carry signal will be de-asserted (e.g., transition from logic "1" to logic "0"). In response to de-assertion of the Carry control signal, the control circuitry 422 of the pulse generator circuitry 420 will change the logic state of the Path_En control signal to cause the first and second switches S1 and S2 to reconnect the tunable resistive device 430 to the Read_Row and Read_Col control lines.

Figure 5:
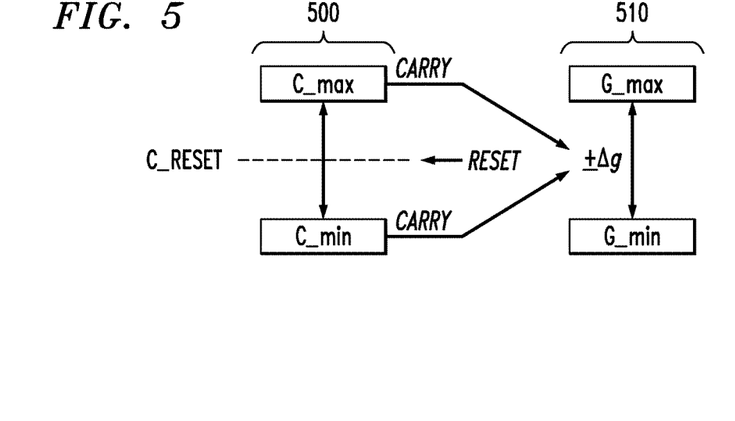
FIG. 5 schematically illustrates an operational mode of the RPU cell of FIG. 4, according to an embodiment of the invention.

FIG. 5 schematically illustrates an operational mode of the RPU cell 400 of FIG. 4 according to an embodiment of the invention. In particular, FIG. 5 schematically illustrates that the bidirectional digital counter 414 has a range of count values 500 which can range from a minimum count value (C_min) to a maximum count value (C_max), and the tunable resistive device 430 has a tunable conductance 510 which can range from a minimum conductance (G min) to a maximum conductance (G max). In one embodiment, depending on the implementation, the bidirectional digital counter 414 comprises a 5-bit counter providing a range of count values from C_min=0 and C_max=31, wherein the counter can operate in up and down directions. Further, in one embodiment, a dynamic range of the tunable conductance can include 40 values from the lowest conductance state (G min) to the highest conductance state (G max).

As further illustrated in FIG. 5, a Carry control signal is output from the bidirectional digital counter 414 when either the C_min or C_max count value is reached during a count sequence. As noted above, the count value of the bidirectional digital counter 414 will either increase or decrease one count value in response to each detected coincidence event of the stochastic bit streams that are applied on the Update_Row and Update_Col control lines input to the coincidence detector 412. In response to the Carry control signal, the weight update control circuitry (e.g., pulse generator 420 and switches S1 and S2) of the RPU cell 400 will operate to either increment or decrement the conductance of the tunable resistive device 430 by one unit $\pm \Delta g_{min}$. As noted above, the unit conductance parameter $\Delta g_{min}$ is proportional to the unit weight parameter $\Delta w_{min}$ through an amplification factor defined in the peripheral circuitry. As further shown in FIG. 5, in response to a Reset control signal, the count value of the bidirectional digital counter 414 will be reset to predefined count reset value (C_Reset), and begin a next count cycle for accumulating weight updates starting from C_Reset. In one embodiment, the C_Reset value is selected to be a mid-point of the count sequence. For example, for a 5-bit counter, the C_Reset value can be selected to be 15 or 16.

With the process shown in FIG. 5, the conductance level of the tunable resistive device 430 is adjusted in an analog and incremental manner each time a count value reaches C_max or C_min. In this regard, the incrementing/decrementing of the count sequence of the bidirectional digital in response to a coincidence detection event emulates the weight update accumulation process: $h_{ij} \leftarrow h_{ij} + \eta x_i \times \delta_j$ such that $\Delta h_{min}$ corresponds to each increment or decrement of a count value. Since the up and down changes in the count value of a digital counter are symmetric by nature, it necessarily follows that there is symmetry in the up ($\Delta h_{min}^+$) and down ($\Delta h_{min}^-$) changes in the weight update accumulation value $h_{ij}$, wherein the Up/Down symmetry, $$\frac{\Delta h_{min}^+}{\Delta n_{min}^-},$$

is equal to ~1.0.

The RPU cell frameworks discussed herein allow for relaxation in the specifications of the tunable resistive device used in the RPU cells with respect to, e.g., symmetry between up and down changes in the conductance value of the tunable resistive device, as such resistive device can be implemented with a lower number of conductance states (e.g., 40 states as opposed to 1000+ states), wherein the conductance state of the tunable resistance device (which defines the W matrix) is incrementally changed (up or down) only in response to an accumulated weight update (defined by the H matrix) reaching a predefined count threshold value. In essence, the H matrix values represent the least significant bits (LSBs) of the weight values of the RPU cells, and the W matrix values represent the most significant bits (MSBs) of the weight values of the RPU cells. This allows the RPU system to be utilized with DNN applications that are configured to perform DNN training operations on RPU cells having 1000+ different weight values, while actually utilizing RPU devices having a conductance resolution of 40 levels or less (not 1000+), thereby providing relaxed device constraints.

Figure 6:
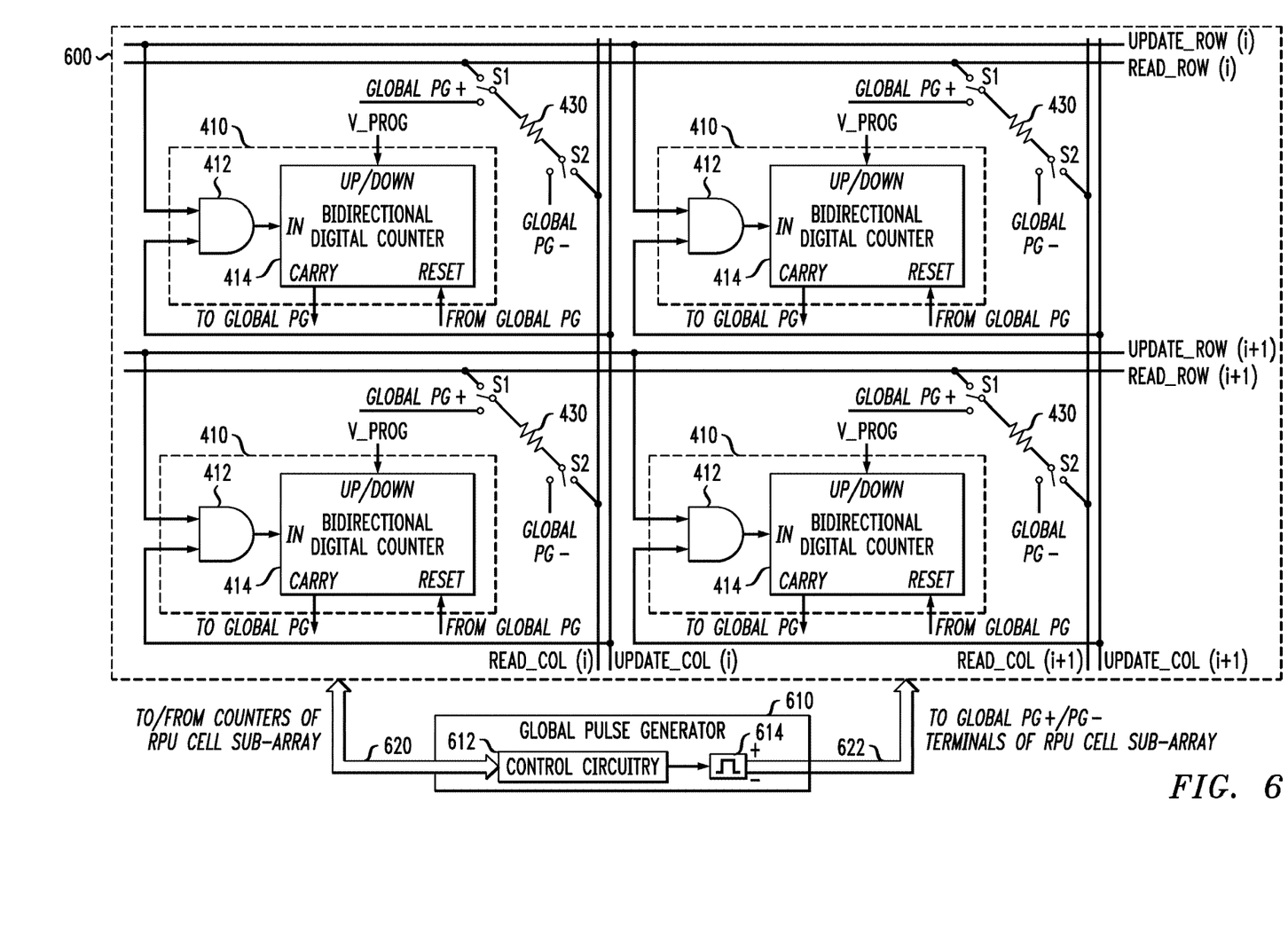
FIG. 6 schematically illustrates an array of RPU cells of an RPU system, wherein each RPU cell implements separate weight matrices to independently perform separate weight update accumulation and inference operations, according to another embodiment of the invention.

FIG. 6 schematically illustrates an array of RPU cells of an RPU system, wherein each RPU cell implements separate weight matrices to independently perform separate inference (weight read) and weight update accumulation operations, according to another embodiment of the invention. In particular, FIG. 6 illustrates an RPU sub-array 600 comprising four RPU cells 600-1, 600-2, 600-3, and 600-4, of an RPU cell array. The RPU cells 600-1, 600-2, 600-3, and 600-4 are connected to respective Update_Row, Update_Col, Read_Row, and Read_Col control lines. As shown in FIG. 6, each row (i) and (i+1) of control lines comprises a pair of Update_Row and Read_Row control lines, and each column (i) and (i+1) of control lines comprises a pair of Update_Col and Read_Col control lines.

As further shown in FIG. 6, each RPU cell 600-1, 600-2, 600-3, and 600-4 comprises weight update accumulation circuitry 410, a tunable resistive device 430, and first and second switches S1 and S2, similar to the RPU cell 400 shown in FIG. 4. However, in the exemplary embodiment of FIG. 6, a global pulse generator 610 is commonly utilized by each RPU cell 600-1, 600-2, 600-3, and 600-4 in the sub-array 600 to perform the same or similar functions as the local pulse generator circuitry 420 within the RPU cell 400 of FIG. 4. The embodiment of FIG. 6 provides a more area (footprint) efficient implementation in which the global pulse generator circuitry 610 is utilized by a plurality of RPU cells, as opposed to each RPU cell having a local, dedicated pulse generator circuit.

As schematically illustrated in FIG. 6, the global pulse generator 610 comprises control circuitry 612 and a pulse generator 614, which have the same or similar functions as the respective components of the local pulse generator circuitry 420 of FIG. 4. A plurality of control lines 620 (or control bus) are implemented to connect the control circuitry 612 of the global pulse generator 610 to the Reset signal input ports and Carry signal output ports of bidirectional digital counters 414 in each of the RPU cells 600-1, 600-2, 600-3, and 600-4 of the RPU cell sub-array 600. In addition, a plurality of control lines 622 are implemented to connect the output terminals of the global pulse generator 610 to control terminals (Global PG+, Global PG−) in each of the RPU cells 600-1, 600-2, 600-3, and 600-4 of the RPU cell sub-array 600. While the example embodiment of FIG. 6 shows the global pulse generator circuit 610 being shared by a 2×2 sub-array of RPU cells 600 within an RPU cell array, in other embodiments, the global pulse generator circuit 610 can be shared by a larger sub-array of RPU cells (e.g., 10×10 sub-array), depending on the array configuration and layout specifications.

In one embodiment, the switches S1 and S2 in each of the RPU cells 600-1, 600-2, 600-3, and 600-4 of the RPU cell sub-array 600 can be locally controlled using the Carry control signal generated by the bidirectional digital counter 414 (as opposed to the Path_En signal generated by the local pulse generator circuitry 420 in the RPU cell framework of FIG. 4). When a Carry control signal is asserted (e.g., logic "1") by a bidirectional digital counter 414 in a given one of the RPU cells 600-1, 600-2, 600-3, and 600-4, the local switches S1 and S2 in the given RPU cell will be activated to connect the associated tunable resistive device 430 to and between the local control terminals (Global PG+, Global PG−) in the given RPU cell. With this configuration, one or more or all of the RPU cells 600-1, 600-2, 600-3, and 600-4 of the RPU cell sub-array 600 can have their respective resistive device 430 connected to the output terminals of the global pulse generator 610 at a given time.

Further, in response to Carry control signals received on one or more of the control lines 620 (from one or more bidirectional counters 414 in the sub-array of RPU cells 600), the control circuitry 612 of the global pulse generator 610 will apply an activation control signal to the pulse generator block 614, which causes the pulse generator block 614 to generate and output a programming pulse on the control lines 622 to each RPU cell 600-1, 600-2, 600-3, and 600-4 in the RPU cell sub-array 600. With this configuration, while each RPU cell 600-1, 600-2, 600-3, and 600-4 receives a programming pulse output from the pulse generator 614, only those RPU cells with a pending Carry signal asserted, and thus, a respective tunable device 430 locally connected to the output terminals (Global PG+, Global PG−) of the global pulse generator 610 at the given time, will perform a weight update operation by changing the conductance level of the tunable resistive device 430 in response to the programming pulse. With this configuration, it is assumed that the global pulse generator 610 has sufficient current driving capability to generate a programming pulse that is capable of updating the weight values of all RPU cells within the given sub-array 600 at the same time.

After the programming pulse is applied to the resistive devices 430 of the RPU cells, the control circuitry 612 will generate a Reset control signal, which is transmitted over the control lines 620 to the Reset input ports of the bidirectional counters 414 in the connected RPU cells. In response to the Reset control signal, the only those bidirectional counters 414 in the connected RPU cells having an asserted Carry control signal will reset their count values, and then de-assert the respective Carry control signals. The de-assertion of the Carry control signal in a given RPU cell causes the local switches S1 and S2 in the given RPU cell to reconnect the tunable resistive device 430 to the respect Read_Row and Read_Col control lines.

Figure 7:
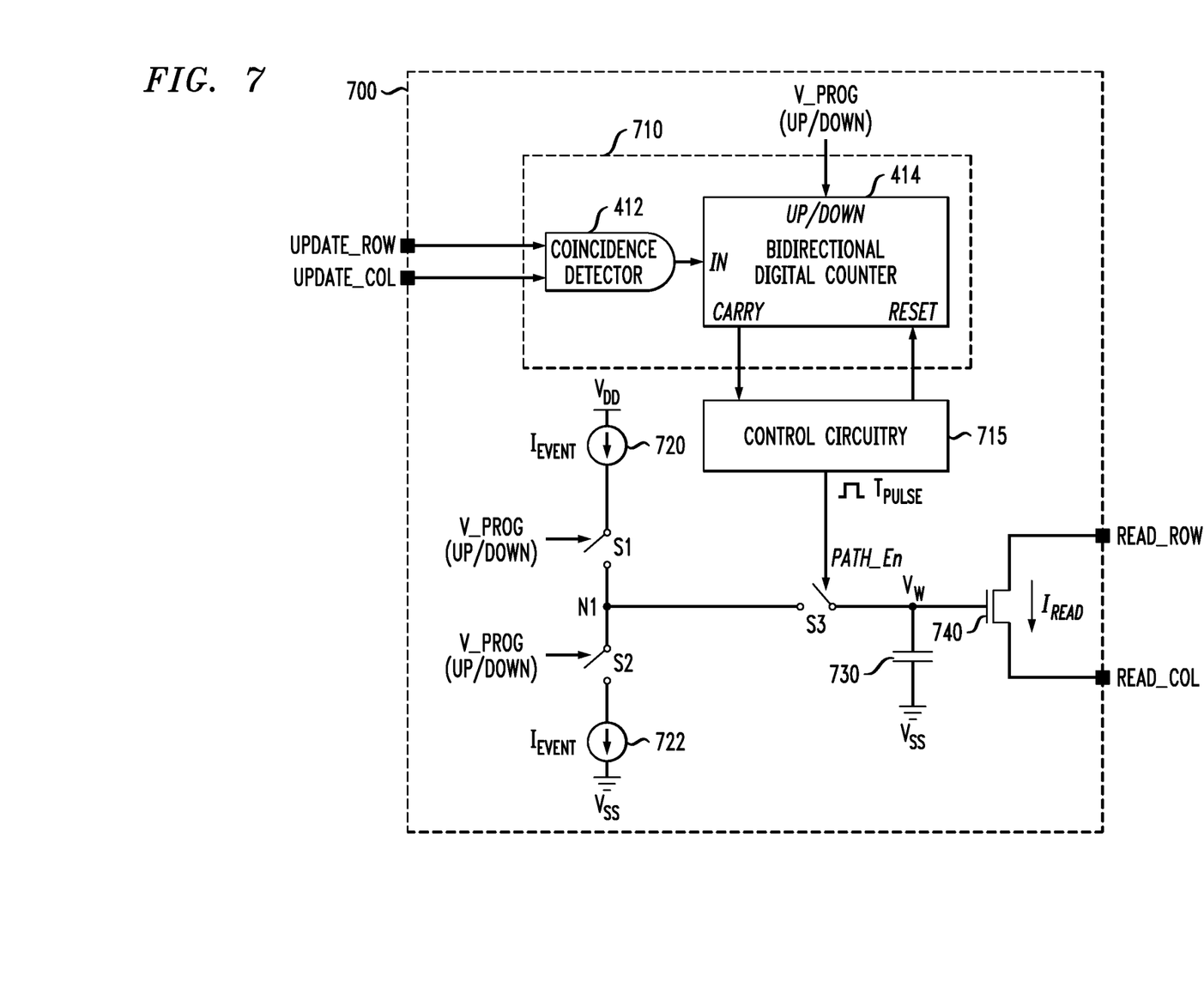
FIG. 7 schematically illustrates an RPU cell architecture in which separate weight matrices are implemented to independently perform separate weight update accumulation and inference operations, according to another embodiment of the invention.

While the example embodiments of FIGS. 4, 6, and 7 are based on an RPU cell framework which utilizes tunable resistive devices such as memristors or resistive memory cells (e.g., RRAM devices), the techniques discussed herein can be implemented in RPU cells that are based on analog CMOS-based framework using, e.g., weight storage capacitors and read transistors for storing and reading RPU cell weight values. For example, FIG. 7 schematically illustrates an RPU cell 700 in which separate weight matrices are utilized to independently perform separate inference (weight read) and weight update accumulation operations, according to another embodiment of the invention. As shown in FIG. 7, the RPU cell 700 comprises weight update accumulation circuitry 710, a first switch S1, a second switch S2, a third switch S3, control circuitry 715, a first current source 720, a second current source 722, a weight storage capacitor 730, and a read transistor 740.

The weight update accumulation circuitry 710 comprises a coincidence detector 412 and a bidirectional digital counter 414, which perform the same or similar functions as in the example embodiments discussed above in the context of FIGS. 4, 5 and 6. In one embodiment, the first current source 720 can be implemented using a PMOS transistor and the second current source 722 can be implemented using an NMOS transistor. The first and second current sources 720 and 722 are serially connected between power supply nodes VDD and VSS. The weight storage capacitor 730 is connected between a node N1 and the power supply node VSS. The read transistor 740 comprises a gate terminal connected to the node N1 and source/drain terminals connected to Read_Row and Read_Col control lines. The control circuitry 715 comprise an input port to receive a Carry control signal from the bidirectional counter 414, an output port to send a Reset control signal to the bidirectional counter 414, and an output port to output a Path_En control pulse.

As shown in FIG. 7, the first and second switches S1 and S2 are selectively activated in response to a programming polarity signal V_Prog. In one embodiment, the switch S1 is activated in response to a logic "1" V programming polarity signal (V_Prog=1), and the switch S2 is activated in response to a logic "0" programming polarity signal (V_Prog=0), In addition, as noted above, the counting direction of the bidirectional digital counter 414 is controlled by the programming polarity signal V_Prog, wherein the bidirectional digital counter 414 will count in an "up" direction in response to a logic "1" programming polarity signal (V_Prog=1), and count in an "down" direction in response to a logic "0" programming polarity signal (V_Prog=0). Further, the switch S3 is selectively activated in response to the Path_En control pulse generated by the control circuitry 715.

In the RPU cell 700 design, the weight storage capacitor 730 serves as a memory element which stores weight value of the RPU cell 700 in the form of electric charge. To perform a weight read operation, the capacitor voltage, or weight voltage Vw, is directly applied to the gate terminal of the read transistor 740 to modulate the channel resistance of the read transistor 740. The charge state stored in the capacitor 730 can be accessed by applying small bias across the source/drain terminals of the read transistor 730 and measuring the current, TREAD. As noted above, for forward and backward (read) operation operations, voltage pulses with predefined amplitude, e.g. VDD and VDD−0.1, are applied to the read transistor 740 from the Read_Row and Read_Col control lines, wherein the small source-drain voltage causes the read transistor 740 to operate in a triode region in which the on-resistance depends on the weight voltage Vw, is directly applied to the gate terminal of the read transistor 740.

The RPU cell 700 implements a weight update process using separate H and W matrix value update operations as follows. As in the example embodiments discussed above, the RPU cell 700 utilizes a stochastic computing scheme wherein the coincidence detector 412 will output a logic level "1" signal, for example, to the data input IN of the bidirectional digital counter 414 for each stochastic pulse coincidence detection event of the stochastic bits streams on the Update_Row and Update_Col control lines. When the count value of the bidirectional digital counter 414 reaches a prespecified count value (e.g., C_min or C_max, FIG. 5), the bidirectional digital counter 414 outputs a control signal Carry. In response to the Carry control signal, the control circuit 715 will generate a Path_En programming pulse (with a predefined pulse width $T_{PULSE}$) to activate (close) the third switch S3 and connect the node N1 to the storage capacitor 730 for the programming period (duration) defined by $T_{PULSE}$.

Depending on the logic level of the programming polarity signal V_Prog, either the first switch S1 will be activated (when V_Prog=1) to connect the first current source 720 to the node N1, or the second switch S2 will be activated (when V_Prog=0) to connect the second current source 722 to the node N1. When the first switch S1 is activated (closed) and the second switch S2 is not activated (open), a current ($I_{EVENT}$) generated by the first current source 720 will charge the weight storage capacitor 730 (for the duration of the programming period $T_{PULSE}$) and increase the weight voltage Vw of the capacitor 730 by a minimum unit voltage change $+\Delta V$. On the other hand, when the first switch S1 is not activated (open) and the second switch S2 is activated (closed), a current ($I_{EVENT}$) generated by the second current source 722 will discharge the weight storage capacitor 730 (for the duration of the programming period $T_{PULSE}$) and decreases the weight voltage Vw of the capacitor 730 by a minimum unit voltage change $-\Delta V$. The third switch S3 will be activated for the duration of the programming period ($T_{PULSE}$) of the programming control signal Path_En. Once the programming control signal Path_En is de-asserted, the control circuitry 715 will generate and output a Reset control signal to reset the bidirectional digital counter 414.

In the RPU cell 700 of FIG. 7, the amount of minimum voltage change per update is determined as:

$$\Delta V_{min} = \frac{I_{EVENT} \times T_{Pulse,min}}{C},$$

where $I_{EVENT}$ denotes the charging and discharging currents from the first and second current sources 720 and 722, respectively, and wherein $T_{PULSE, min}$ denotes a minimum programming pulse width the programming control signal Path_En. In conventional systems where 1200 states (conductance levels of read transistor 740), the RPU cell would require a relatively large weight voltage storage capacitor 730, or require a very small $I_{EVENT}$ which is hard to control below a certain range. However, the exemplary framework of the RPU cell 700 shown in FIG. 7 which implements a separate weight update accumulation scheme using a hidden H matrix allows the RPU cell to have a lower number of states (e.g., 40) for the weight matrix W, which serves to relax the specifications on the capacitor 730 and read transistor 740 devices. In addition, the implementation of the H matrix allows less frequent updates on the W matrix, thereby applying less stress on limited endurance RPU devices, such as memristors and capacitors/transistors, which serve to implement the RPU cell weight values, thereby prolonging the lifetime of the RPU devices.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

We claim:

1. A resistive processing unit (RPU) device, comprising:
weight update accumulation circuitry having a first input connected to an update row control line, and a second input connected to an update column control line;
weight update control circuitry connected to an output of the weight update accumulation circuitry; and
a tunable resistive device coupled to the weight update control circuitry, and connected to a read row control line and a read column control line;
wherein the weight update accumulation circuitry is configured to (i) maintain a weight update accumulation value $h_{ij}$ and adjust the weight update accumulation value $h_{ij}$ by one unit update value $\Delta h$ in response to each detected coincidence of stochastic bits streams of input vectors applied on the update row and update column control lines, and (ii) output a weight update control signal to the weight update control circuitry in response to the accumulated weight value $h_{ij}$ reaching a predefined threshold value; and
wherein the weight update control circuitry is configured to adjust a conductance level of the tunable resistive device by one unit conductance value $\Delta g$ in response to the weight update control signal output from the weight update accumulation circuitry, wherein the one unit conductance value $\Delta g$ corresponds to one unit weight value $\Delta w$ of the RPU device.

2. The RPU device of claim 1, wherein the weight update accumulation circuitry is configured to perform accumulated weight update operations concurrently with a read operation in which a weight value $w_{ij}$ of the RPU device is sensed by applying read control voltages on the read row and read column control lines connected to the tunable resistive device.

3. The RPU device of claim 1, wherein the weight update accumulation circuitry and the weight update control circuitry are configured to receive a programming polarity control signal and adjust the weight update accumulation value and the conductance level of the tunable resistive device by one of (i) incrementing and (ii) decrementing the weight update accumulation value and the conductance level, depending on a polarity of the programming polarity control signal.

4. The RPU device of claim 1, wherein the weight update accumulation circuitry comprises:
a coincidence detector having inputs connected to the update row and update column control lines; and
a bidirectional digital counter having a data input port connected to an output of the coincidence detector;
wherein the coincidence detector is configured to output a detection signal to the data input port of the bidirectional digital counter in response to each detected coincidence of the stochastic bits streams of the input vectors applied on the update row and update column control lines; and
wherein the bidirectional digital counter is configured to (i) adjust a count value in response the detection signal input to the data input port, and (ii) output the weight update control signal to the weight update control circuitry in response to the count value reaching a predefined count value.

5. The RPU device of claim 4, wherein the weight update control circuitry comprises pulse generator circuitry that is configured to generate a programming voltage pulse to adjust a conductance level of the tunable resistive device by one unit conductance value $\Delta g$.

6. The RPU device of claim 5, wherein the pulse generator circuitry is configured to generate a reset control signal that is input to a reset control port of the bidirectional digital counter to reset a count value of the bidirectional digital counter to a predefined initialization count value following adjustment of the conductance level of the tunable resistive device.

7. The RPU device of claim 4, wherein the predefined count value comprises one of a minimum count value and a maximum count value of the bidirectional digital counter.

8. The RPU device of claim 4, wherein the coincidence detector comprises an AND logic circuit.

9. The RPU device of claim 1, wherein the weight update control circuitry comprises pulse generator circuitry, and wherein the tunable resistive device comprises a tunable memristive device, wherein the pulse generator circuitry is configured to applying a programming voltage pulse across the tunable memristive device to adjust a conductance level of the tunable memristive device by one unit conductance value Δg.

10. The RPU device of claim 9, wherein the weight update control circuitry comprises a first switch and a second switch, wherein the first switch and the second switch are responsive to a path enable control signal to selectively connect the tunable memristive device across first and second output terminals of the pulse generator circuitry to perform a weight update process, and to selectively connect the tunable memristive device to the read row and read column control lines to perform a weight read operation.

11. The RPU device of claim 9, wherein the pulse generator circuitry comprises a local dedicated pulse generator circuit that is located within a footprint area of the RPU device.

12. The RPU device of claim 9, wherein the pulse generator circuitry comprises a global pulse generator circuit that is located outside a footprint area of the RPU device, wherein the global pulse generator circuit is shared with at least one other RPU device in an array of RPU devices.

13. The RPU device of claim 1, wherein the weight update control circuitry comprises a first current source, a second current source, and a capacitor, and wherein the tunable resistive device comprises a read transistor;
wherein the capacitor is configured to store a weight voltage for the RPU device;
wherein the read transistor comprises a gate terminal, a first source/drain terminal, and a second source/drain terminal, wherein the gate terminal is connected to the capacitor, wherein the first source/drain terminal is connected to read row control line, and wherein the second source/drain terminal is connected to the read column control line;
wherein the read transistor is configured to generate a weight current in response to the weight voltage of the capacitor applied to the gate terminal of the read transistor, in response to read control signals applied to the read row and read column control lines;
wherein in response to the weight update control signal output from the weight update accumulation circuitry, the weight update control circuitry is configured to one of (i) selectively activate the first current source to apply a charging current to the capacitor to increase a weight voltage of the capacitor by one unit voltage change +ΔV and (ii) selectively activate the second current source to apply a discharging current to the capacitor to decrease a weight voltage of the capacitor by one unit voltage change −ΔV.

14. An RPU crossbar array system comprising the RPU device of claim 1.

15. A method comprising:
performing a weight update operation to update a weight value of a resistive processing unit (RPU) device comprising a tunable resistive device, wherein the weight update operation comprises:
maintaining a weight update accumulation value $h_{ij}$ for the RPU device;
adjusting the weight update accumulation value $h_{ij}$ by one unit update value Δh in response to a detected coincidence of stochastic bits streams of input vectors applied on an update row and update column control lines connected to the RPU device;
generating a weight update control signal in response to the accumulated weight value $h_{ij}$ reaching a predefined threshold value; and
adjusting a conductance level of the tunable resistive device by one unit conductance value Δg in response to the weight update control signal, wherein the one unit conductance value Δg corresponds to one unit weight value Δw of the RPU device.

16. The method of claim 15, further comprising performing a weight read operation to read a weight value $w_{ij}$ of the RPU device, wherein the weight read operation comprises:
applying read control voltages on read row and read column control lines connected to the tunable resistive device; and
processing a read current that is generated by the tunable resistive device in response to the read control voltages, wherein the read current corresponds to a weight value $w_{ij}$ of the RPU device;
wherein the weight read operation is performed concurrently with the step of adjusting the weight update accumulation value of the weight update operation.

17. The method of claim 15, wherein adjusting the weight update accumulation value comprises adjusting a count value of a bidirectional digital counter, and wherein generating the weight update control signal comprises generating a carry control signal when the count value reaches a predefined count value.

18. The method of claim 15, wherein generating the weight update control signal comprises generating a programming voltage pulse in response to the carry control signal, and applying the programming voltage pulse to the tunable resistive device to adjust the conductance level of the tunable resistive device by one unit conductance value Δg.

19. The method of claim 18, further comprising generating reset control signal that is input to a reset control port of the bidirectional digital counter to reset a count value of the bidirectional digital counter to a predefined initialization count value following adjustment of the conductance level of the tunable resistive device.

20. The method of claim 15, wherein the tunable resistive device comprises a read transistor and a capacitor connected to a gate terminal of the read transistor, wherein the capacitor is configured to store a weight voltage for the RPU device; and
wherein adjusting a conductance level of the tunable resistive device in response to the weight update control signal comprises at least one of:
selectively activating a first current source to apply a charging current to the capacitor to increase a weight voltage of the capacitor by one unit voltage change +ΔV; and
selectively activating a second current source to apply a discharging current to the capacitor to decrease a weight voltage of the capacitor by one unit voltage change −ΔV.

* * * * *